May 8, 1923.

E. A. ZADIG

RECTIFIER OR CONVERTER

Filed Nov. 24, 1919          2 Sheets-Sheet 1

Inventor
Ernest A. Zadig.
By [signature] Atty.

May 8, 1923.
E. A. ZADIG
RECTIFIER OR CONVERTER
Filed Nov. 24, 1919
1,454,144
2 Sheets-Sheet 2
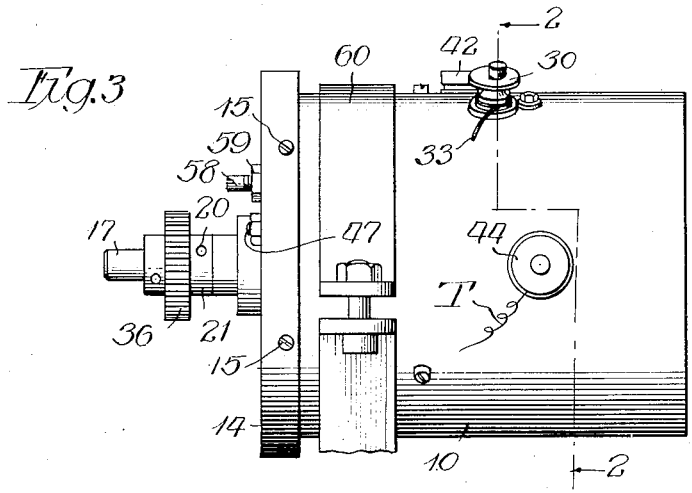
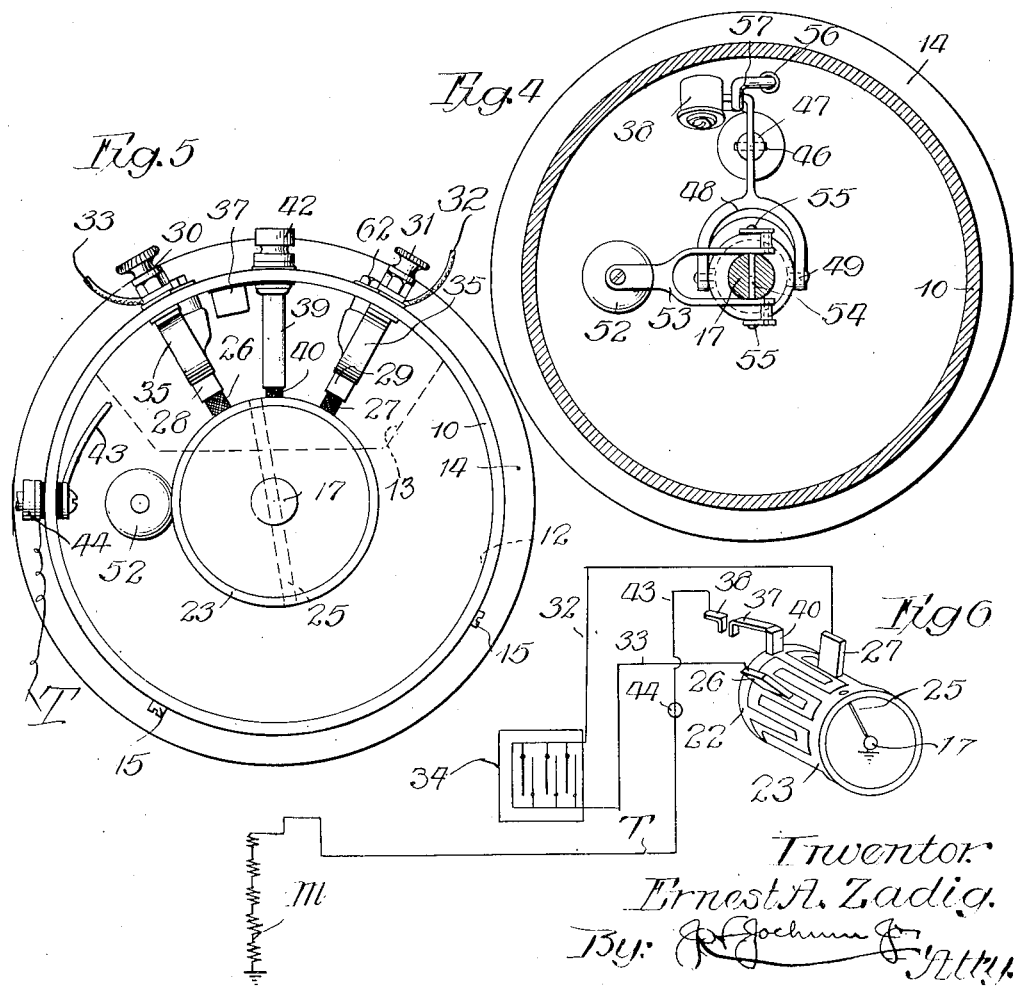
Inventor
Ernest A. Zadig.

Patented May 8, 1923.

1,454,144

UNITED STATES PATENT OFFICE.

ERNEST A. ZADIG, OF CHICAGO, ILLINOIS.

RECTIFIER OR CONVERTER.

Application filed November 24, 1919. Serial No. 340,200.

*To all whom it may concern:*

Be it known that I, ERNEST A. ZADIG, a subject of the present Government of Germany, residing in Chicago, in the county of Cook and State of Illinois, have invented certain new and useful Improvements in Rectifiers or Converters, of which the following is a specification.

This invention relates to improvements in rectifier or converter particularly adapted though not necessarily limited in its use, in connection with the magneto on automobiles, whereby the storage battery may be charged from the magneto, and which device operates to continually select the proper wave polarity and utilize substantially all of the wave making almost a continuous direct current.

A further object is to provide an improved mechanical device of this character operating in phase with the engine and having means for automatically cutting out the rectifier as the engine speed decreases or the magneto voltage drops below that of the battery, or the engine ceases to operate, and which means will also automatically become effective when the engine starts to operate, or its speed increases or the magneto voltage equals or exceeds that of the battery.

A further object is to provide an improved device of this character which is adapted to be readily installed and which may as readily be removed.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention and in which:

Figure 3 is a side elevation of the device.

Figure 4 is a sectional view taken on line 4—4, Figure 1.

Figure 5 is a right hand end elevation of the parts shown in Figure 3.

Figure 6 is a diagrammatic view of the commutator and wiring.

Figure 1:
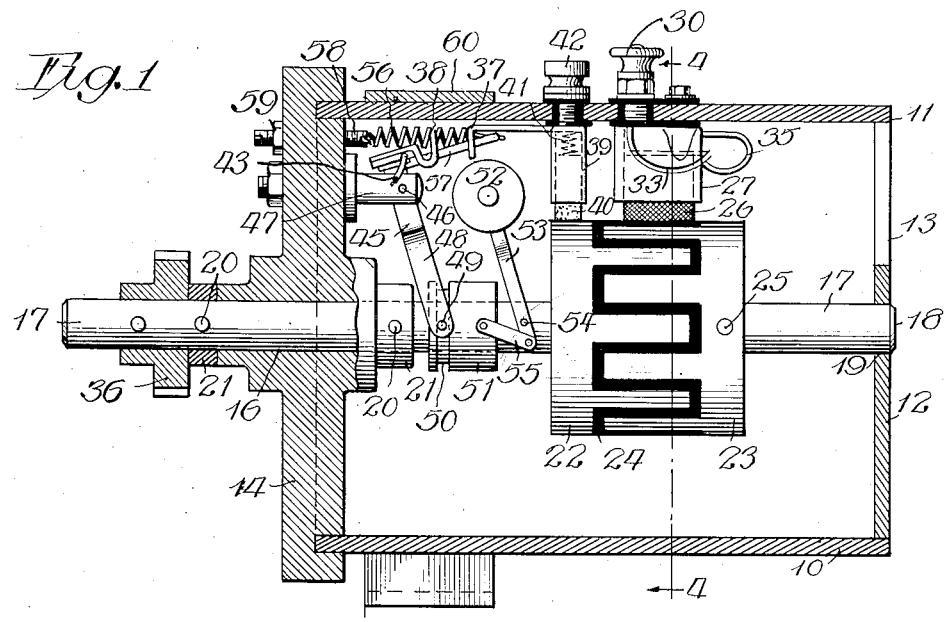
Figure 1 is a vertical longitudinal sectional view of a rectifier or converter of this character constructed in accordance with the principles of this invention and as taken on line 1—1, Figure 2.
Figure 2:
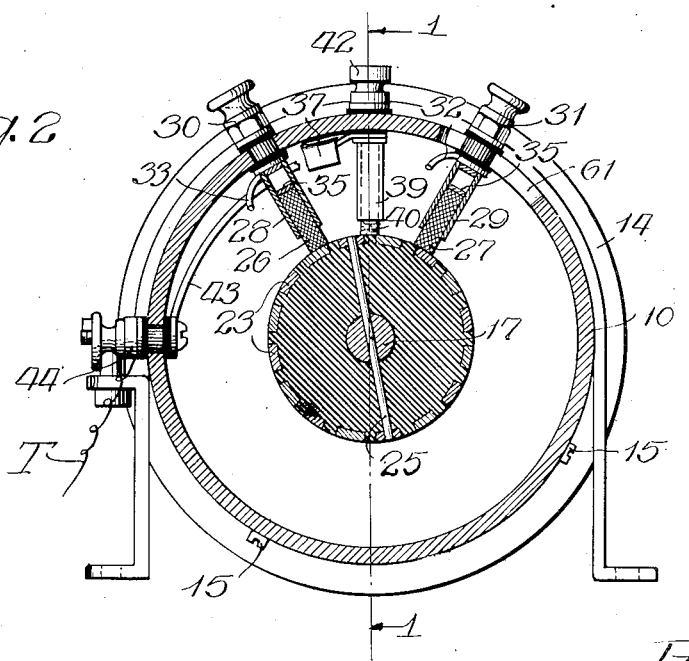
Figure 2 is a vertical sectional view taken on line 2—2, Figure 3.

The operating parts of the mechanism are preferably located within a housing or casing 10 which may be of any desired size and configuration and is provided with an open end 11 having a closure 12 therein and which closure may be provided with an opening 13 through which the parts may be visible. The other end of the housing is closed as at 14 by means of a head, which latter may be removably secured in position in any desired or suitable manner such as by means of fastening devices 15 so as to enable the operator to readily remove the head 14 when desired.

This head 14 is provided with a bearing 16 through which a commutator shaft 17 passes, the end 18 of the shaft being journaled in a suitable bearing 19 preferably in the removable closure 12. The shaft is held against longitudinal movement in any suitable manner such as by means of fastening devices or pins 20 passing through suitable collars 21. Mounted upon the shaft 17 and within the housing is a commutator which embodies oppositely disposed segments 22—23 separated from each other by the usual insulation 24. The segment 23 is preferably grounded by means of the shaft 17 through the medium of a pin 25 which passes through the segment 23 and also through the shaft 17.

Mounted within the housing 10 preferably upon the wall thereof are brushes 26—27 which may be of any desired construction or type and these brushes are respectively mounted in holders 28—29, the latter being secured to the casing wall by means of suitable fastening devices and having respectively connected therewith binding posts 30—31 to which the conductors 32—33 are connected and which conductors also have connection with the battery 34 to be charged.

The brushes 26—27 are so arranged that the brush 26 will rest upon and have electrical connection with the segment 22 while the brush 27 rests upon and has electrical connection with the segment 23 and the segments 22—23 being alternately arranged with respect to each other, it will be manifest that as the commutator rotates the brushes 26—27 will alternately pass from the segments 22 to the segments 23.

Suitable springs 35 may be provided for holding the brushes in contact with the commutator segments.

The commutator shaft 17 is rotated in any desired or suitable manner, that is from the engine, timer or any other operating part which will cause the commutator to operate in phase with the engine.

To that end there may be provided a gear 36 which is connected with the shaft 17 and through the medium of which gear suitable connection may be made to the operating part.

A suitable cut out may be provided for cutting out the rectifier or converter when the engine speed decreases or the magneto voltage drops below that of the battery, or the engine ceases to operate, and for cutting in the commutator when the engine starts or its speed increases or the magneto voltage equals or exceeds that of the battery. To that end there may be provided co-operating contacts 37—38 one of which contacts, to wit, the contact 37, is in electrical connection with a brush holder 39 having a brush 40 which is in electrical connection with the segment 22. A spring 41 may be provided for controlling the brush 40 and the brush holder 39 is secured to the wall of the housing 10 in any suitable manner. A clamping screw 42 is connected with the brush holder 39 for securing the brush holder in position. A conductor 43 is electrically connected with the movable contact terminal 38, and this conductor is in turn connected with a binding post 44, and to which latter is connected one of the terminals T of the magneto M.

The contact 38 which is adapted to co-operate with the contact 37 is mounted to be moved into and out of operative relation with respect thereto so as to open and close the circuit and cut out and cut in the commutator. This contact terminal 38 is adapted for shifting movement to be automatically actuated. To that end the contact terminal is mounted upon an arm 45 pivotally mounted as at 46 upon a suitable support 47 preferably carried by the head 14. The end 48 of the arm is preferably formed into a yoke which is provided with pins 49 adapted to enter a groove 50 in a collar 51 which is slidably mounted upon the shaft 17. A weight 52 is mounted upon an arm 53 and which arm is pivoted as at 54 and is connected by means of links 55 with the collar 51 so that when the commutator shaft 17 is rotated, the collar 51, weight 52 and supporting arm 53 will also be rotated and the centrifugal force caused by the rotation of these parts will cause the weight to be thrown in a direction to shift the arm 53 and thereby move the collar 51 upon the shaft 17. The movement of the collar upon its shaft will, through the medium of the arm 45, shift the contact terminal 38 so as to move it into engagement or out of engagement with the contact terminal 37 to open or close the circuit. The operation of this centrifugal shifting means is controlled entirely by the speed of rotation of the shaft 17.

A spring 56 may be provided, one end of which is connected with the arm 45 preferably through the medium of an arm 57 and the other end is connected to an adjustable anchor 58 preferably in the form of a threaded bolt passing through the head 14 and by means of the adjustment of which bolt, the tension of the spring 56 may be varied as desired by means of which the parts may be adjusted to cut in and out at practically zero current flow. A lock nut 59 may be provided for locking the bolt in its adjusted position.

In use, the rectifier or converter is supported in any convenient position either in close proximity to the timer or at any other point and may be connected with its operating mechanism either directly or through the medium of intermediate gearing or shafting and is held in position in any suitable manner preferably by means of a band or bracket 60 which is anchored to any suitable support, the binding post 44 is connected to one of the terminals of the magneto, and the conductors 32—33 are connected with the battery 34 and one to each of the brushes 26—27.

In installing the device and in order to place the rectifier or converter in phase with the magneto, the housing 10 is adapted to be adjusted or rotated within the holding band or bracket 60 and then the housing is secured against further movement in any suitable manner. After this adjustment and in order to more accurately correct the timing so that the rectifier or converter will cut in on practically zero of the wave, the brush 27 is mounted for relative adjustment with respect to the housing 10. To that end there may be provided in the wall of the housing 10, a slot or opening 61 through which a portion of the brush holder 29 projects so as to permit the brush to be moved with respect to the commutator. The brush holder 29 may be then secured against further adjustment by means of a suitable clamp or securing means 62 which may also operate in the slot in the housing wall. After the brush 27 has been properly adjusted the clamping device 62 may be adjusted to hold the parts securely in their adjusted positions.

With this improved construction it will be manifest that there is provided a mechanical device which operates as a rectifier or converter for transforming the alternating current of the magneto into a direct current for charging the battery 34, while the engine is operating. When the engine ceases to operate or its speed decreases the commutator is cut out. To that end there is provided the automatic cut out.

With this improved construction and as the commutator rotates it will be manifest that it will cut in on practically zero of the wave and will continually select the proper wave polarity and will also utilize practically all of the wave resulting in almost a continuous direct current. Obviously the segments of the commutator must be in multiples of the windings of the magneto coil and the speed of rotation must also be in multiple phase with the windings.

While the preferred form of the invention has been herein shown and described, it is to be understood that various changes may be made in the details of construction and in the combination and arrangement of the several parts within the scope of the claims without departing from the spirit of this invention.

What is claimed as new is:—

1. A commutator, a commutator shaft, a cut out embodying separable contact terminals, a pivotally mounted element to which one of the said terminals is connected, yielding means tending normally to move the said element in one direction to separate the terminals, a collar slidable upon the shaft and operatively connected with the said element for rocking the latter when the collar is shifted on the shaft, and a governor pivotally connected with the said shaft and operatively connected with the said collar, said governor operating to shift said collar against the stress of the said yielding means to shift the contact terminal that is connected with the said element.

2. A commutator, a commutator shaft, a cut out embodying separable contact terminals, yielding means tending normally to move the terminals in one direction with relation to each other, a collar slidable upon the shaft and operatively connected with one of the terminals for actuating it, centrifugally controlled means connected with the collar and operating to move the collar to shift the contact terminal that is connected therewith in the opposite direction and against the stress of the said yielding means, and a casing housing all of the parts of the commutator, there being a sight opening in the wall of the casing through which the parts may be inspected.

3. The combination of a magneto, means embodying mechanical mechanism in electrical connection with the magneto whereby a battery may be charged from the magneto, a supporting structure for the said means, provisions whereby the said supporting structure may be adjusted to place the said mechanism in phase with the magneto, and additional means for correcting the timing of the first recited means and the magneto.

4. In combination, a magneto, a commutator in electrical connection with the magneto, commutator brushes, means for actuating the commutator and embodying a shaft, a cut out in the circuit between the commutator and magneto, a collar slidable upon the shaft connected with the cut out for actuating the latter, centrifugally controlled means operatively connected with the collar for shifting the latter, a housing in which all of the parts are located, and means supporting the housing for adjustment whereby the commutator may be timed with the magneto.

In testimony whereof I have signed my name to this specification on this 10th day of November, A. D. 1919.

ERNEST A. ZADIG.